United States Patent [19]

Schraut

[11] Patent Number: 4,941,558
[45] Date of Patent: Jul. 17, 1990

[54] CLUTCH DISC

[75] Inventor: Alfred Schraut, Waigolshausen, Fed. Rep. of Germany

[73] Assignee: Fichtel & Sachs AG, Schweinfurt, Fed. Rep. of Germany

[21] Appl. No.: 255,548

[22] Filed: Oct. 7, 1988

[30] Foreign Application Priority Data

Oct. 14, 1987 [DE] Fed. Rep. of Germany ... 8713810[U]

[51] Int. Cl.$^5$ .............................................. F16D 13/60
[52] U.S. Cl. .............................. 192/107 C; 192/107 R
[58] Field of Search ........................ 192/107 C, 107 R

[56] References Cited

U.S. PATENT DOCUMENTS

| 3,696,902 | 10/1972 | Dantele | 192/107 C |
| 4,260,048 | 4/1981 | Beccaris | 192/107 C |
| 4,529,078 | 7/1985 | Keck | 192/107 C |

FOREIGN PATENT DOCUMENTS

| 2063881 | 7/1972 | Fed. Rep. of Germany . | |
| 3047933 | 7/1982 | Fed. Rep. of Germany ... | 192/107 C |
| 3126070 | 1/1983 | Fed. Rep. of Germany ... | 192/107 C |
| 1170215 | 11/1969 | United Kingdom . | |
| 2087489 | 5/1982 | United Kingdom . | |

Primary Examiner—Rodney H. Bonck
Assistant Examiner—Andrea Pitts
Attorney, Agent, or Firm—Toren, McGeady & Associates

[57] ABSTRACT

The clutch disc for a motor vehicle friction clutch comprises a hub (1) with a lining carrier disc (9) held thereon and several friction lining plates (15), arranged in the region of the external circumference of the lining carrier disc and offset in the circumferential direction in relation to one another, axially on both sides of the lining carrier disc (9). The friction lining plates (15) arranged on at least one axial side of the lining carrier disc (9) are secured through axially resilient spring segments (23) on the lining carrier disc (9). The spring segments are radially domed and are held on the lining carrier disc (9) both in the circumferential direction on both sides laterally of the friction lining plate (15) by first rivets (35) and radially towards the hub (1) laterally of the friction lining plate (15) by second rivets (33). The first rivets (35) pass with radial play through holes (41) in the spring segment (23) and guide the spring segment (23) in the region of the holes (41) radially movably on the lining carrier disc (9). The clutch disc is distinguished by high mechanical and thermal loading capacity.

2 Claims, 2 Drawing Sheets

CLUTCH DISC

BACKGROUND OF THE INVENTION

The invention relates to a clutch disc for a motor vehicle friction clutch and especially a clutch disc with axially sprung friction lining plates.

From British Patent No. 1,170,215 a clutch disc for the friction clutch of a motor vehicle is known which carries friction lining plates axially on both sides of a lining carrier disc held on a hub. The friction lining plates consist of sintered material and are fitted directly on the lining carrier disc on the side facing the engine of the motor vehicle, while on the side facing the gearing of the motor vehicle they are secured with the aid of axially resilient spring segments on the lining carrier disc. The spring segments are domed in the circumferential direction of the lining carrier disc and have in their middle rectangular projections which engage in complementarily formed recesses of the lining carrier disc and guide the spring segment non-rotatably but axially movably on the lining carrier disc. The torque loading capacity of a clutch disc of this kind is however limited, especially since nevertheless a relative rotation of the friction lining plates and the lining carrier disc can occur, which undesiredly influences the operating behaviour of the clutch.

From German Offenlegungsschrift No. 2,063,881 a further clutch disc for a motor vehicle friction clutch is known in which lining carrier segments protruding in star form radially from the external circumference are integrally formed on the lining carrier disc, which is held on a hub. The lining carrier segments are domed in the circumferential direction and carry complementary lining carrier segments domed likewise in the circumferential direction but in the opposite direction on their concave side. The mutually associated lining carrier segments are narrowed in the region of the transition to the external circumference of the lining carrier disc and connected by rivets with one another and if appropriate with the lining carrier disc. Friction lining plates, for example of a sintered material, are riveted on the convex, outwardly directed sides of the lining carrier segments, which are axially resilient in relation to one another. The power which can be transmitted through a clutch disc of this kind is however likewise inadequate for some utilization cases. In fact the danger of the occurrence of a relative movement of the friction lining plates and the lining carrier disc in the circumferential direction is reduced, but the danger exists that the clutch disc may warp under high thermal loading in the region of the lining carrier segments, which has a disadvantageous effect upon the operational behaviour of the friction clutch since the clearance distance of the friction clutch is normally slight.

Contrary to known clutch discs the invention provides a clutch disc for a motor vehicle friction clutch which is capable of high loading both mechanically and thermally.

SUMMARY OF THE INVENTION

The clutch disc in accordance with the invention comprises a hub with a lining carrier disc held thereon. In the region of the external circumference of the lining carrier disc several friction lining plates staggered in relation to one another in the circumferential direction are arranged axially on both sides of the lining carrier disc. The friction lining plates consist preferably of a metal-containing sintered material, such for example as metal ceramics. On at least one of the two axial sides, preferably the side of the lining carrier disc facing the gearing of the motor vehicle, there are arranged axially resilient spring segments, each of which carries at least one of the friction lining plates arranged on this axial side of the lining carrier disc. The spring segments are domed substantially exclusively in the radial direction and held on the lining carrier disc both in the circumferential direction laterally of the friction lining plate secured thereto by first securing elements, especially rivets, and radially towards the hub laterally of the friction lining plate by second securing elements, preferably likewise formed as rivets. While the second rivets connect the spring segments fast with the lining carrier disc, the first securing elements guide the spring segments with axial play radially movably on the lining carrier disc. In this way the axially sprung friction lining plates are guided nearly torsionally rigidly and with stable form on the lining carrier disc, even under high thermal loading. The fastening is furthermore mechanically very durable.

In a preferred development the spring segment protrudes both in the circumferential direction on both sides of the friction lining plate and radially towards the hub with an edge strip of closed surface between the fastening elements and substantially following the edge contour of the friction lining plate. The edge strip, secured to the lining carrier disc through the first and second securing elements, thus has no holes or slots extending transversely of the outer edge which could have a disadvantageous effect upon the torsional behaviour of the spring segment.

In order to be able to avoid torsional vibrations of the transmission line or possibly simply to damp them, the inertia moment of the clutch disc should be as small as possible. This requirement can be combined with the requirement of high load capacity of the clutch if according to a further expedient development the friction lining plates and the spring segments have approximately trapezium form and taper towards the hub, while the first rivets and the surface centre of gravity of the friction lining plates are arranged approximately on the same radius about the axis of rotation of the clutch disc. Especially if the lining carrier disc has radially outwardly open recesses it is possible to achieve a relatively slight inertia moment of the clutch disc.

The first securing elements are expediently spacer rivets which pass with radial play through holes in the spring segments and the heads of which, which engage behind the spring segment, hold the spring segment with axial play on the lining carrier disc. The hole through which the shank of the spacer rivet passes can be formed as a circular hole or as a radially extending slot.

In a preferred development the friction lining plate is secured on the spring segment with two rivets, of which one is arranged on a radius smaller than the radius of the centre of gravity of the surface of the friction lining plate and the other on a larger radius This permits the use of identical friction lining plates on the two sides of the lining carrier disc.

The various features of novelty which characterize the invention are pointed out which particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

An example of embodiment of the invention will be explained in greater detail below by reference to a drawing, wherein.

DESCRIPTION OF PREFERED EMBODIMENTS

Figure 1:
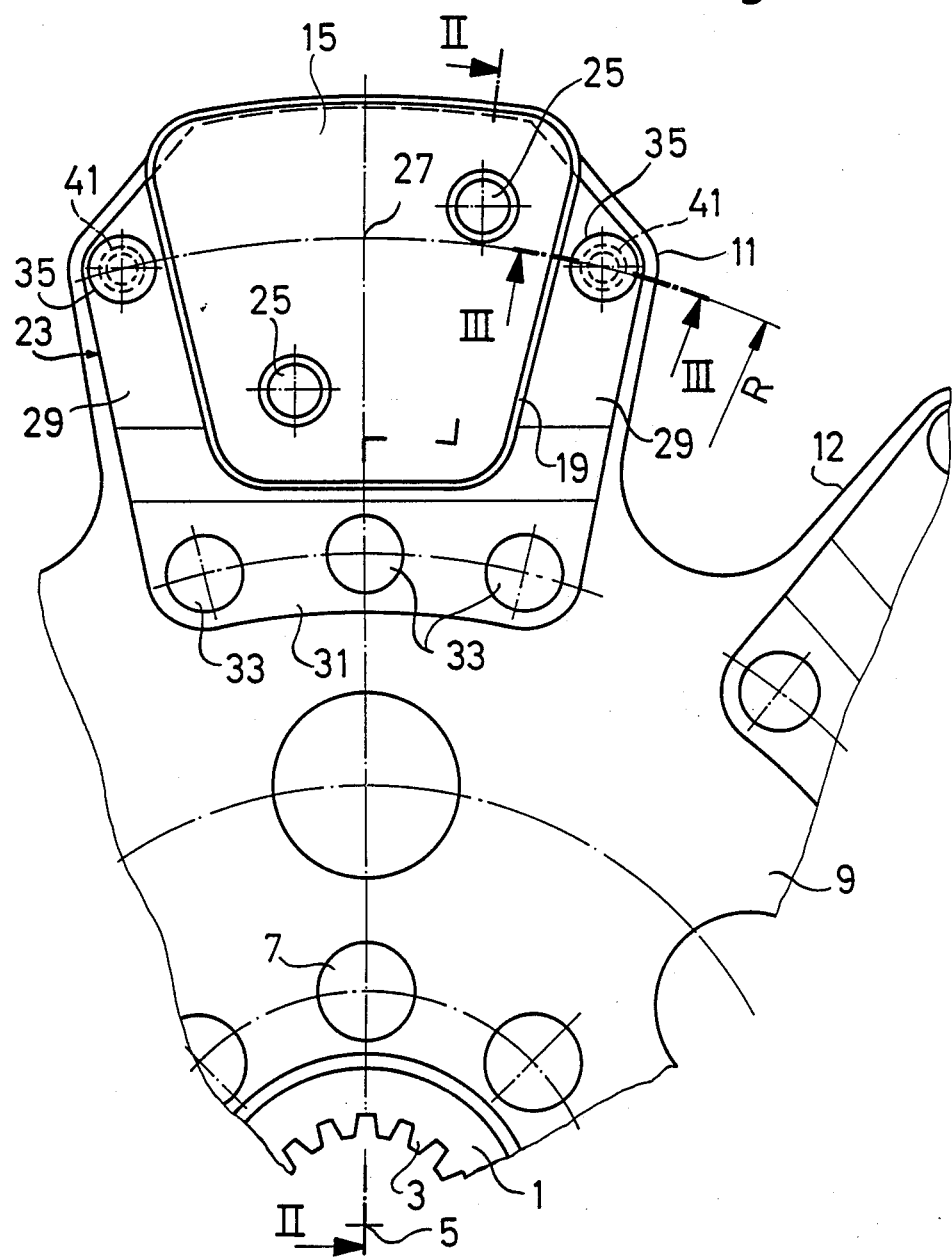
FIG. 1 shows a partial plan view of a clutch disc for a motor vehicle friction clutch.
Figure 2:
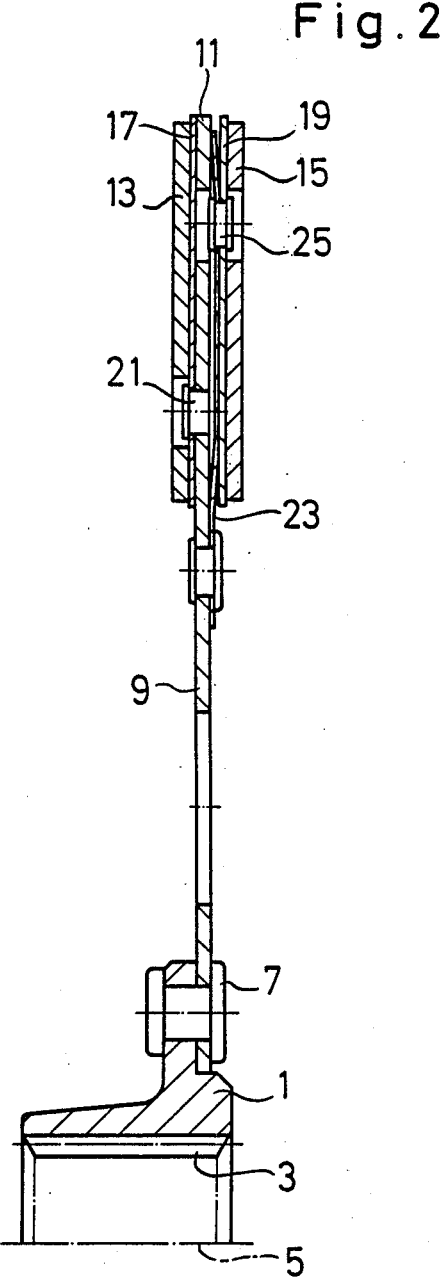
FIG. 2 shows a sectional view of the clutch disc, seen along a line II—II in FIG. 1

As shown by FIGS. 1 and 2, the clutch, which is suitable especially for the friction clutch of a tractor or lorry, comprises a hub 1 having an internal toothing 3 through which it is guided in the conventional manner non-rotatably but axially displaceably on a gear input shaft (not illustrated further), which is rotatable about a rotation axis 5. A hub disc or lining carrier disc 9 formed as a flat sheet metal part, from which carrier segments 11 protrude radially in star form in the region of the external circumference, is secured on the hub 1 with rivets 7. The carrier segments 11 are separated from one another in the circumferential direction by radially extending, outwardly open apertures 12.

Axially on both sides of the carrier segments 11 substantially trapezium-shaped friction lining plates 13, 15 are arranged which carry, on their mutually facing faces, carrier plates 17, 19 for the securing on the lining carrier disc 9. The friction lining plates 13,15 can consist of conventional friction material, but are preferably manufactured from a metal-containing sintered material, for example metal ceramics. At least the external contours of the friction lining plates 13, 15, arranged substantially coincidently oppositely, for the one part, and of the carrier plates 17, 19 for the other part are identical. For preference the friction lining plates 13, 15, including the carrier plates 17, 19 secured thereto, are as a whole identical in all dimensions.

The friction lining plates 13 facing the engine of the motor vehicle are each secured by two rivets 21, of which FIG. 2 shows only one, directly to the lining carrier segments 11. On the other hand the friction lining plates 15 facing the gearing are secured through axially resilient spring segments 23 on the lining carrier disc 9. The lining carrier segments 11 being relatively non-resilient with respect to the spring segments 23. For the securing of the friction lining plate 15 to the spring segment 23 two rivets 25 are provided which, like the rivets of the friction lining plate 13, are arranged substantially diagonally offset in relation to the trapezium-shaped surface of the friction lining plate 15. The arrangement is made such that one of the rivets 25 or 21 is arranged on a radius smaller than the radius, designated by R in FIG. 1, through the surface centre of gravity 27 of the trapezium form, tapering towards the hub 1, of the friction lining plates 13, 15, while the second rivet 25 or 21, as the case may be, is provided on a radius larger than the radius R. In the case of such a manner of arrangement, despite identical configuration of the friction lining plates 13, 15, the rivets 21, 25 are staggered in relation to one another. It is self-evident that apertures for the reception of the rivet heads are provided in the friction linings and possibly the lining carrier segment 11.

The spring segments 23 are domed in the radial direction and have a contour protruding beyond the friction lining plates 15 in the circumferential direction on both sides of the friction lining plates 15, forming edge strips 29, and radially towards the hub 1 forming edge strips 31, the edge strips 29, 31 substantially following the contour of the friction lining plate 15. Along the edge strip 31 protruding towards the hub 1 each spring segment 23 is secured on the lining carrier disc 9 by several rivets 33, here three. The rivets 33 are arranged on the same radius from the rotation axis 5, the radius being smaller than the radius through the bottoms of the recesses 13, that is extending in a region of the lining carrier disc 9 which is otherwise closed in the circumferential direction. In the circumferential direction on both sides of the friction lining plate 15 each spring segment 23 is guided by spacer rivets 35 both axially and radially movably on the lining carrier segment 11. The spacer rivets 35 are here arranged at a distance from the rotation axis 5 which is substantially equal to the radius R through the surface centre of gravity 27 of the lining carrier plate 15.

Figure 3:
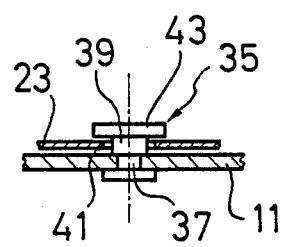
FIG. 3 shows a detail section through the clutch disc, seen along a line III—III in FIG. 1.

As shown best by FIG. 3, each spacer rivet 35 is secured with a narrowed shank section 37 on the lining carrier segment 11 and passes with a thickened shank section 39 with radial play through a hole 41 of larger diameter of the spring segment 23. At the free end of the shank section 39 a head 43 engages with axial play behind the spring segment 23. The hole 41 can have circular form or be made as a radial slot. The spacer rivet 35 prevent unacceptable twisting of the spring segment 23, whereby faults in the clutch disengagement operation of the clutch could occur, even in the case of thermal loading of the clutch disc. The marginal zones 29, 31 have closed surfaces between the rivets 35 and 33 for the one part and the rivets 33 for the other part, that is they contain no holes or marginal slots which could influence the torsion behaviour of the spring segment in an undesired manner.

The trapezium-shaped configuration of the friction lining plates 13, 15 and the contour, thus likewise substantially trapezium-shaped, of the spring segments 23, which furthermore approximately coincidently follow the contour of the lining carrier segments, ensure a comparatively slight inertia moment of the clutch disc with high load capacity.

While specific embodiments of the invention have been shown and described in detail to illustrate the application of the inventive principles, it will be understood that the invention may be embodied otherwise without departing from such principles.

What I claim is:

1. A clutch disc for a motor vehicle friction clutch, comprising:

a hub (1) with a lining carrier disc (9) held thereon, which lining carrier disc (9) includes in the region of its outer circumference several star-shaped radially projecting lining carrier segments (11) offset against each other in a circumferential direction, the carrier segments being separated from each other by recesses (12) which are arranged to open towards the outer circumference of the carrier disc (9);

friction pad plates (13), (15) arranged in pairs axially on both sides of each lining carrier segment (11), said pairs of friction pad plates including first friction pad plate (13) fastened at the lining carrier segment (11), and a second friction pad plate (15);

radially curved spring segments (23), each second friction pad plate (15) being fastened at one of the spring segments (23);

first fastening elements (35) arranged so as to guide each spring segment in a circumferential direction on both sides of the second friction pad plate (15) so that the spring segment is radially movable with axial clearance at the lining carrier segment (11); and second fastening elements (33) arranged so as to retain the spring segments radially toward the hub (1) at the lining carrier disc (9), the lining carrier segments (11) being relatively non-resilient with respect to the spring segments (23), and the spring segments (23) being arranged so as to project beyond the second friction pad plates (15) in a circumferential direction on both sides of the second friction pad plates (15), as well as radially towards the hub with edge strips (29), (31) which are continuously flat between the first and second fastening elements and which essentially follow an edge contour of the second friction pad plates (15).

2. A clutch disc as defined in claim 1, wherein the friction pad plates (13), (15) and the spring segments (23) have an approximately trapezoidal form which tapers towards the hub (1), the first fastening elements (35) and the surface center of gravity (27) of the friction pad plates (13), (15) being arranged on an approximately equal radius R, the second friction pad plate (15) being secured on the spring segment (23) by two fastening elements (35), one of which is arranged on a radius smaller than the radius R of the surface center of gravity (27), and the other of the fastening elements being arranged on a larger radius.

* * * * *